US006539619B2

(12) United States Patent
Hakala

(10) Patent No.: US 6,539,619 B2
(45) Date of Patent: Apr. 1, 2003

(54) CLIP FASTENER

(76) Inventor: John Hakala, 57 Golden Glen Dr., Simi Valley, CA (US) 93065

(*) Notice: Subject to any disclaimer, the term of this patent is extended or adjusted under 35 U.S.C. 154(b) by 0 days.

(21) Appl. No.: 09/815,458

(22) Filed: Mar. 23, 2001

(65) Prior Publication Data

US 2001/0013521 A1 Aug. 16, 2001

Related U.S. Application Data

(63) Continuation-in-part of application No. 09/301,493, filed on Apr. 28, 1999, now Pat. No. 6,206,236.

(51) Int. Cl.[7] ................................................ B23Q 7/10
(52) U.S. Cl. ........................................ 29/814; 29/809
(58) Field of Search .................... 29/814, 809; 221/276

(56) References Cited

U.S. PATENT DOCUMENTS 2,158,168 A 5/1939 Woodruff
2,641,051 A 6/1953 Vick
2,833,028 A 5/1958 Treimann
2,835,027 A 5/1958 Phillips
2,840,892 A * 7/1958 Erdmann
3,019,519 A 2/1962 Gaurino
3,100,932 A 8/1963 Pipkin
3,170,596 A * 2/1965 Nyberg
3,235,950 A 2/1966 Smotzer
3,254,398 A 6/1966 MacCondray
3,324,538 A 6/1967 Christensen
3,402,454 A * 9/1968 Hartman
3,422,989 A * 1/1969 Long
3,429,431 A 2/1969 MacCondray
3,543,376 A * 12/1970 Lovell
3,793,696 A 2/1974 Barr
3,829,954 A 8/1974 Takamizawa
4,261,098 A 4/1981 Lincoln
4,299,013 A * 11/1981 Lincoln
5,400,501 A 3/1995 Marshall
5,971,206 A * 10/1999 Manukyan

* cited by examiner

*Primary Examiner*—Douglas Olms
*Assistant Examiner*—Steven Blount
(74) *Attorney, Agent, or Firm*—Colin P. Abrahams

(57) ABSTRACT

A clip fastener comprises a housing and a releasable cartridge located in or on the housing for holding a plurality of clips. A track is provided for receiving clips from the magazine. A ram rod moves the clip along a pathway defined by the track, and a spreader in the pathway separates an inner loop of the clip from an outer loop thereof.

28 Claims, 8 Drawing Sheets

FIG. 1
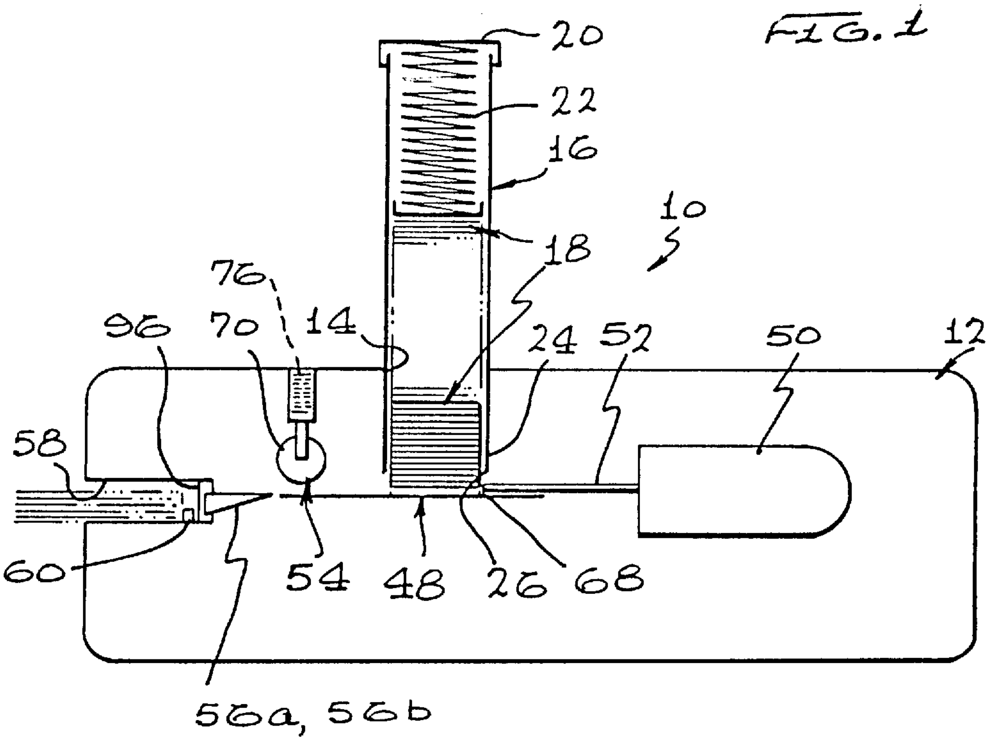
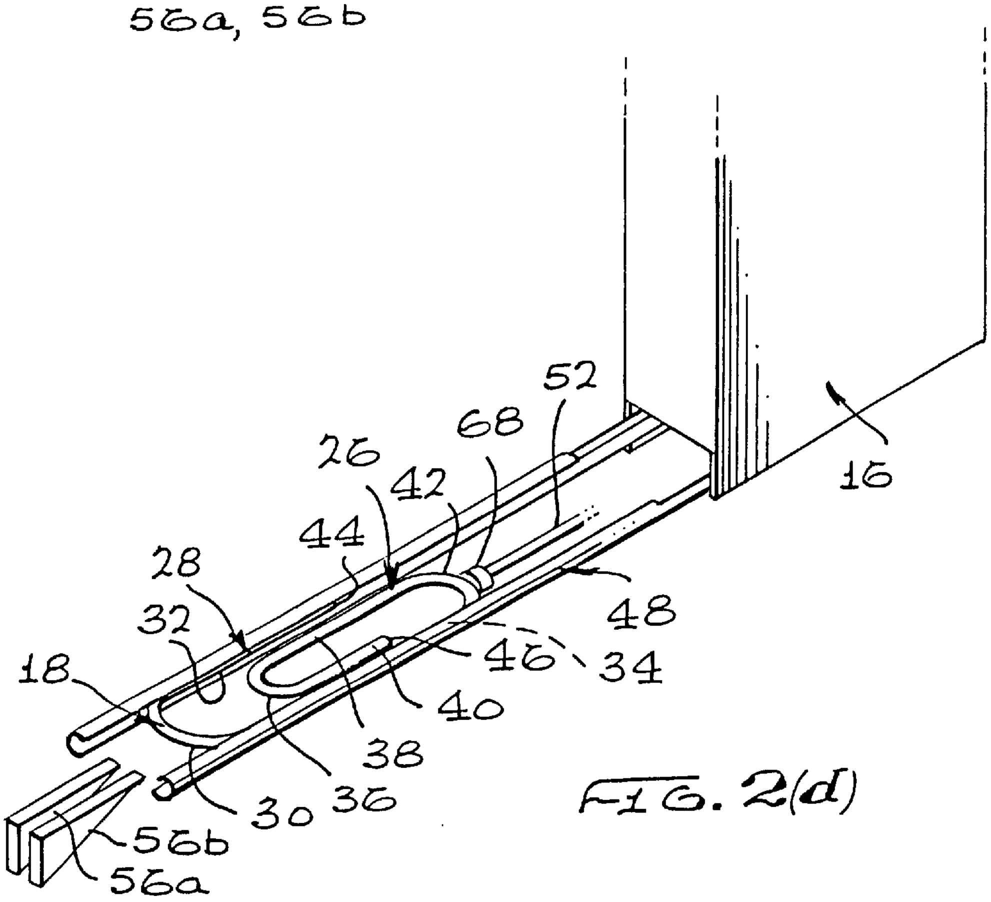
FIG. 2(d)

FIG. 6
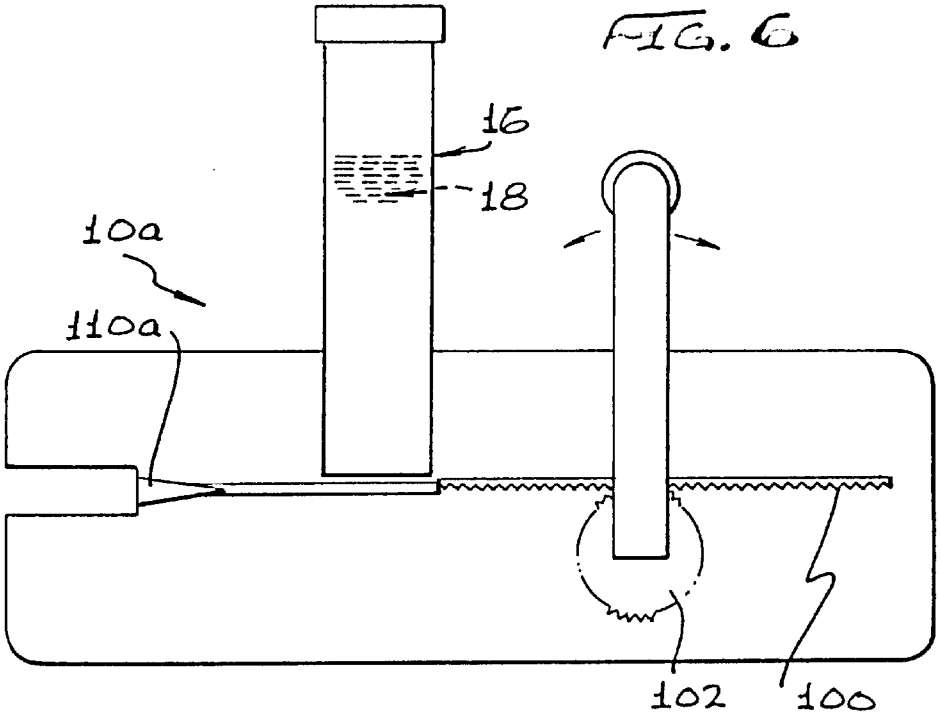
FIG. 7(c)
FIG. 7(a)
FIG. 7(b)
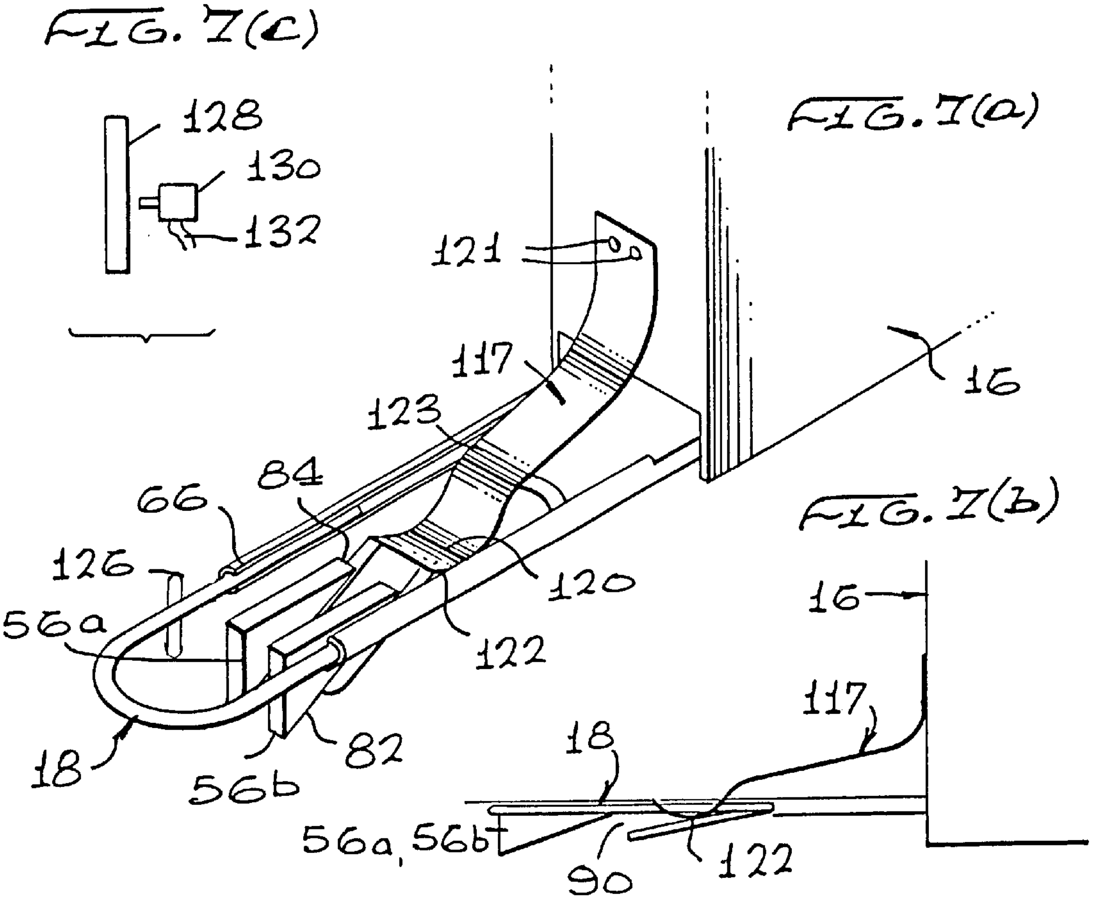

FIG. 8
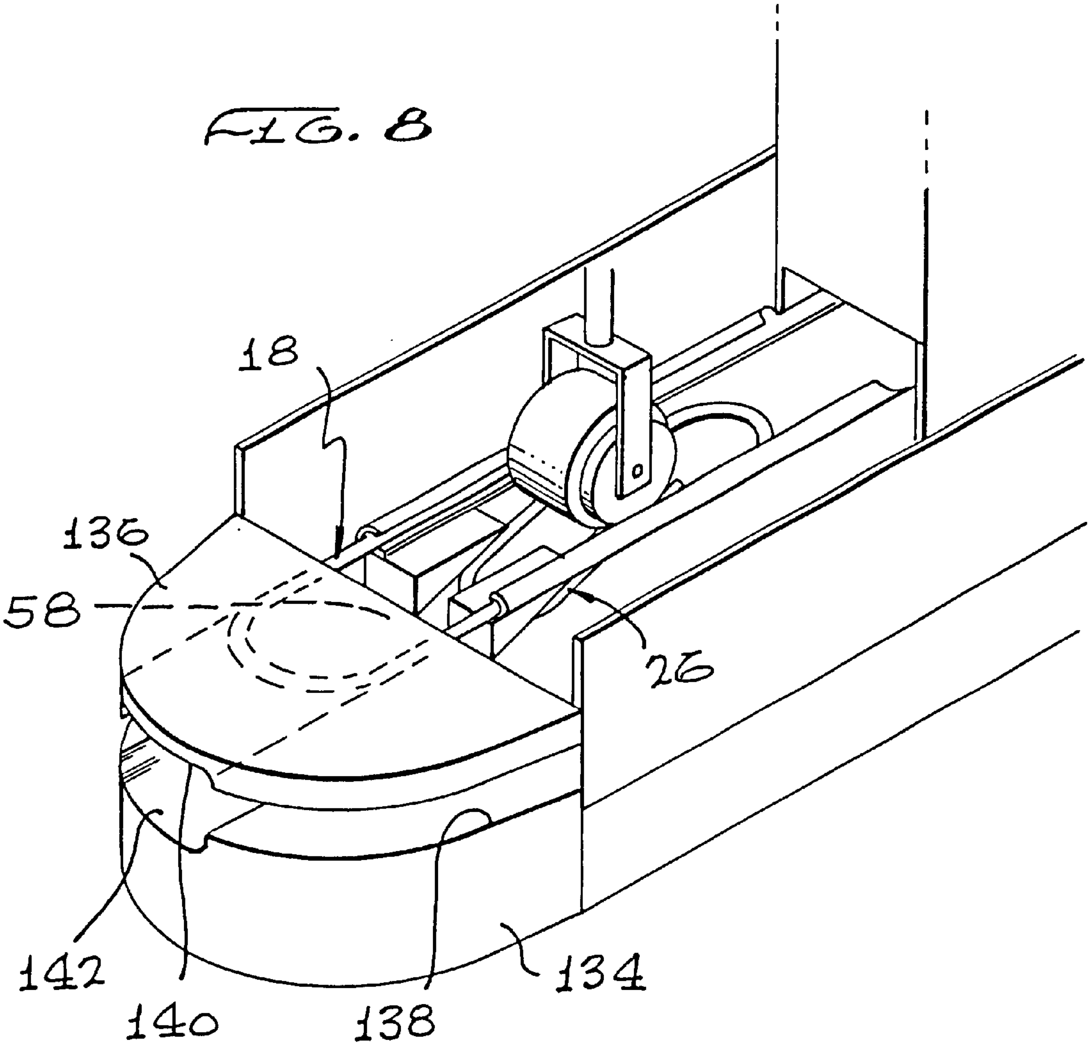
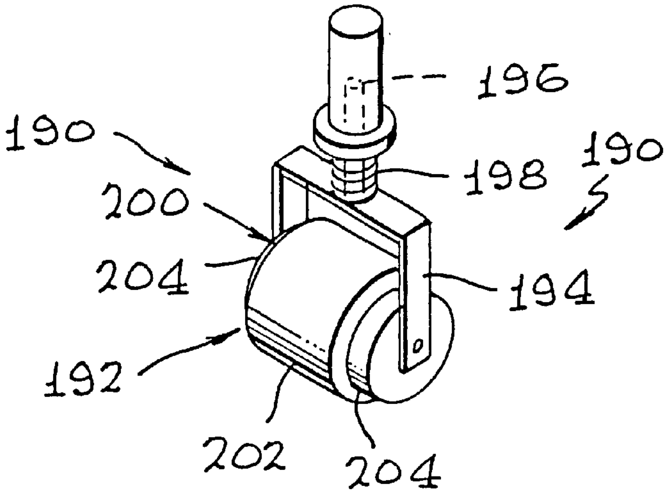
FIG. 12

FIG. 14
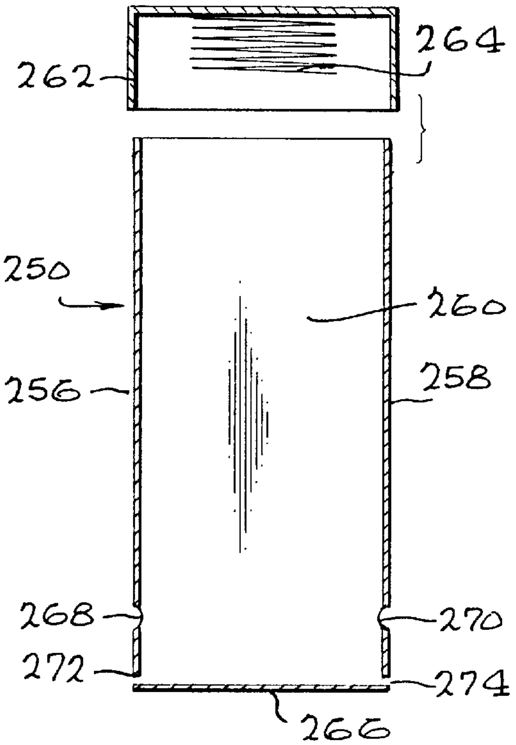
FIG. 15(a)
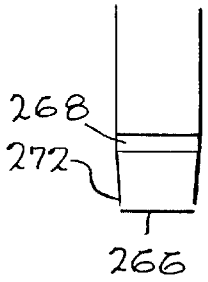
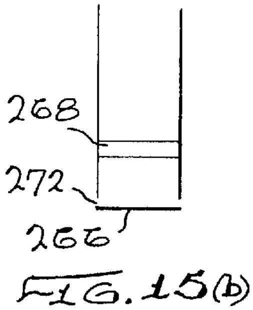
FIG. 15(b)
FIG. 13
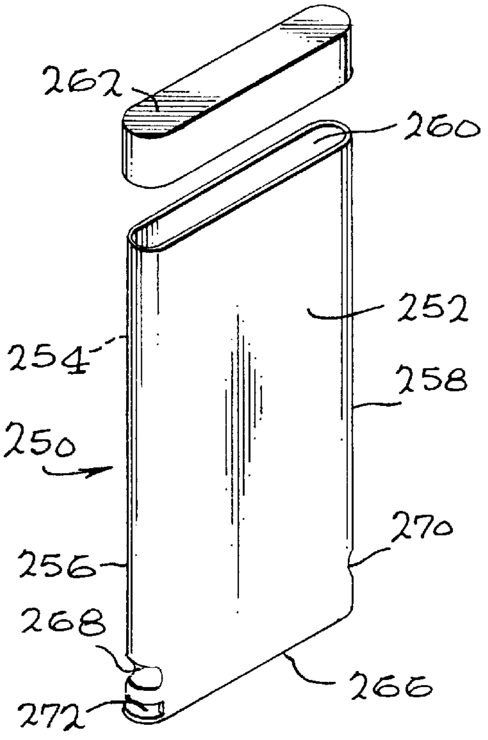
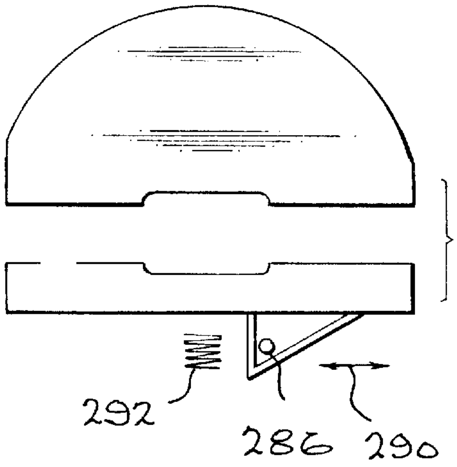
FIG. 17

CLIP FASTENER

CROSS REFERENCE TO RELATED APPLICATIONS

This application is a continuation-in-part of U.S. patent application Ser. No. 09/301,493 filed Apr. 28, 1999, now U.S. Pat. No. 6,206,236, which is incorporated herein in its entirety.

FIELD AND BACKGROUND OF THE INVENTION

This invention relates to clip fasteners. Particularly, the invention is one for a paper clip fastener which can store a plurality of clips in a storage area or magazine, and automatically locate a clip about a stack of papers or other materials upon actuation, whether manual, electrical or otherwise, of the fastener.

As is well known, the paper clip has become an indispensable accessory, used in offices as well as homes. The paper clip essentially comprises a length of narrow steel wire bent in a curve upon itself at approximately 180° at three points along its length. The paper clip has an outer loop and an inner loop. Since the paper clip is comprised of spring steel, the outer loop and inner loop can be moved in opposite directions to create a space therebetween in which a stack of papers or other materials can be received. A slight but sufficient force inherent in the steel tends to close the inner and outer loops and keep the papers securely in position.

For the most part, paper clips are applied manually by a person to a stack of papers. This involves neatly arranging the stack of papers so that they fully overlap each other, removing a paper clip from a box or other container, spreading the inner and outer loops of the paper clip from each other and thereafter applying it to the stack of papers. This is a fairly slow and cumbersome process, especially when large mailings take place, and it is necessary to repeat this process a substantial number of times.

Another factor which tends to cause inconvenience and delay in applying paper clips is that the paper clips are usually arranged randomly in the box or container and, during the packing and transport procedures, often become entangled or connected with each other. Therefore, removal of a paper clip from a container may often result in having to separate it from one or more other paper clips.

Although various paper clip applicators which comprise machines or devices for automatically placing paper clips onto a stack of paper have been proposed and form part of the patent literature, these are often complex machines which are not user-friendly, or are large and difficult to use in practice. Some of these paper clip applicators are discussed below.

U.S. Pat. No. 3,325,538 (Christensen) teaches a paper clip dispensing and applying device wherein a paper clip rests on ledges. A slide moves the paper clip forward over a cam which enters a space, causing the outer part of the clip to be spread from the inner part. The cam has an inclined face. On contact with the cam or spreader, the inner leg of the clip will be flexed downwardly and opened more as the clip is forced against the spreader by the slide. After the clip has surrounded the papers, the spreader passes the outer leg and opens the rear loop of the clip to allow the clip to spring back and grip the papers.

U.S. Pat. No. 3,019,519 (Guarino) describes a clip design mechanism for applying paper clips where the paper clip is moved by a ram forward onto rails. Depressing means tend to force down the inner bend of the clip providing a space so that it can be readily attached to the pile of papers. The depressing means contains a finger or paddle extending from a shaft on a cross-bar. The ends of the cross-bar have an extension on which springs are located to keep the tongue in a normally downward position. Garryana also shows a spacer pad used to hold a paper sheaf in a plane lower than the outer loop of the paper clip.

U.S. Pat. No. 2,835,024 (Phillips) describes a paper clip dispenser including a mechanism with an ejector for pushing a paper clip from a magazine. Phillips also teaches a movable spreader tine having a straight portion and a curved portion fixed to a pivot lever. The pivot lever is linked to the ejector mechanism by a link bar. The spreader tine is designed so that the curved portion engages the advancing clip of the inner coil, and as the clip moves forward, the inner coil is intercepted and deflected downwardly.

U.S. Pat. No. 2,641,051 (Vick) teaches a paper clip applicator in which a plunger is moved forwardly by a knob through a slider. A paper clip is picked up from the end of the stack and moved forwardly over a cam which, in combination with a rocker cam, spreads the clip. Vick shows a spreading mechanism including rails or shoulders in association with a plunger, and the cam and the rocker cam.

Other patents also show different forms of paper clip dispensing apparatus and related type of office machines, and these include: U.S. Pat. No. 3,325,950 (Smotzer); U.S. Pat. No. 2,833,028 (Treimann); U.S. Pat. No. 3,100,932 (Pipkin); U.S. Pat. No. 3,254,398 (Macondray); U.S. Pat. No. 3,429,431 (Macondray); U.S. Pat. No. 3,402,454 (Hartman); U.S. Pat. No. 3,793,696 (Barr); U.S. Pat. No. 5,400,501 (Marshall); U.S. Pat. No. 4,261,098 (Lincoln); U.S. Pat. No. 3,829,954 (Takamizawa) and U.S. Pat. No. 2,158,168 (Woodruff).

Many of the paper clip applicators shown above lack simplicity and ease of application. It is an object of the present invention to provide a clip fastener which is reliable, easy to use and economical, so as to facilitate the rapid and efficient application of either large or small clips onto a stack of papers or other materials.

SUMMARY OF THE INVENTION

The invention provides a clip fastener wherein a magazine or receptacle, such as a removable cartridge, contains a stack of aligned clips which may be serially dispensed in a mechanism which rapidly spreads the outer loop and inner loop of the clip and applies them to a stack of papers or other materials appropriately located within the machine.

The invention is also unique in the fact that, at least in one form, the mechanism can be adjusted so that different size clips (commonly referred to as standard and jumbo size paper clips) can be accommodated within the same device.

In one aspect, the clip fastener therefore comprises a magazine or cartridge mechanism, a rail or track upon which a clip is dispensed when needed, a mechanism for moving the clip along the track, and structure for spreading the outer loop and inner loop of the clip just prior to its contact with the paper or other materials so that the outer and inner loops of the clip straddle the stack of papers or other materials. The spreader mechanism is operative with respect to the clip while the leading edges of the clip approach the stack of papers or other materials, but as soon as the inner and outer loops straddle different/opposite sides of the stack of papers or other materials, the clip passes off the spreader so that the inherent forces of the spring steel of which the clip is made can move back toward normal positions. In such positions, the inner and outer loops have a tendency to force toward each other so as to firmly hold the stack of papers or other materials within their grasp.

According to one aspect of the invention, there is provided a clip fastener comprising: a housing; a magazine or cartridge located in or on the housing for holding a plurality of clips; a track for receiving clips from the magazine or cartridge; means for moving the clip along a pathway defined by the track; and spreader means in the pathway for separating an inner loop of the clip from an outer loop thereof.

Preferably, the track comprises a pair of substantially parallel guide rails, each guide rail for receiving a side piece of the outer loop of the clip, the distance between the rails slightly exceeding the width defined by side pieces of a clip's inner loop. A section of the rails may have an overlapping flange, the flange and the rails defining a groove within which the side pieces of the outer loop of the clip can be received.

Conveniently, the means for moving the clip along the pathway defined by the track comprises a ram and ram rod, the ram rod having a head portion for engaging the clip and pushing it along the pathway. The length of travel of the ram rod may be determined by the width of the lower portion of the cartridge.

Preferably, the clip fastener includes a pair of wedge-shaped spreaders having a sharpened leading edge, an upper edge substantially parallel and coplanar with the track, and a lower inclined surface, each wedge for engaging a clip as it moves along the pathway for separating the inner loop of the clip from the outer loop thereof. The clip fastener may also have a depressing member immediately upstream of the spreader means, the depressing member for pushing down slightly the leading part of the inner loop of the clip to facilitate engagement of the spreader between the inner loop and the outer loop.

In a preferred form, the track for receiving clips is adjustable so as to be capable of accommodating clips of different sizes. The adjustable track may comprise a pair of substantially parallel rails mounted on support members, the support members including actuation means for moving the pair of rails toward or away from each other. In one embodiment, the pair of rails are moved toward or away from each other automatically by the insertion of a cartridge, the dimensions of the cartridge determining the distance between the rails.

A base member and cover may be provided defining therebetween a slot, the base member and cover being attached to the housing downstream of the spreader means, the slot for receiving a stack of papers or other materials for insertion therein and for proper positioning to receive a clip.

BRIEF DESCRIPTION OF THE DRAWINGS

In the drawings:

FIG. 1 is a schematic side view of one embodiment of the clip fastener of the invention;

FIGS. 2(*a*), 2(*b*) and 2(*c*) show, schematically, the stages of operation of the clip fastener as shown in FIG. 1;

FIG. 2(*d*) is a perspective view showing the clip on the guides or rails;

FIG. 5(*b*) is a top view showing a detail of the clip fastener shown in FIG. 5(*a*);

FIG. 5(*c*) is a perspective view of a ring clip for use with a clip fastener as shown in FIG. 5(*a*);

FIG. 6 is a schematic side view of a fourth embodiment of a clip fastener of the invention;

FIG. 7(*a*) is a perspective view showing a further embodiment of the clip fastener, with a spring steel strip instead of a roller;

FIG. 7(*b*) is a side view of the clip fastener as shown in FIG. 7(*a*);

FIG. 7(*c*) is a switch mechanism for a clip fastener, shown in the embodiment illustrated in FIG. 7(*a*);

FIG. 8 is a perspective view of a clip fastener of the invention including details showing the cover and slot for receiving a stack of papers or other materials;

FIG. 12 is a perspective view of a roller which may be used with the adjustable clip fastener shown in FIG. 9;

FIG. 13 is a perspective view of a cartridge for use with a clip fastener of the invention in another embodiment thereof;

FIG. 14 is a cross-section through the cartridge shown in FIG. 13;

FIGS. 15(*a*) and 15(*b*) are partial front views of cartridges for small and large clips respectively ;

FIG. 17 is a front view of another embodiment of the clip fastener of the invention.

DETAILED DESCRIPTION OF THE PREFERRED EMBODIMENTS

Figures 2A, 2B, 2C, 3, 5B, 5C:
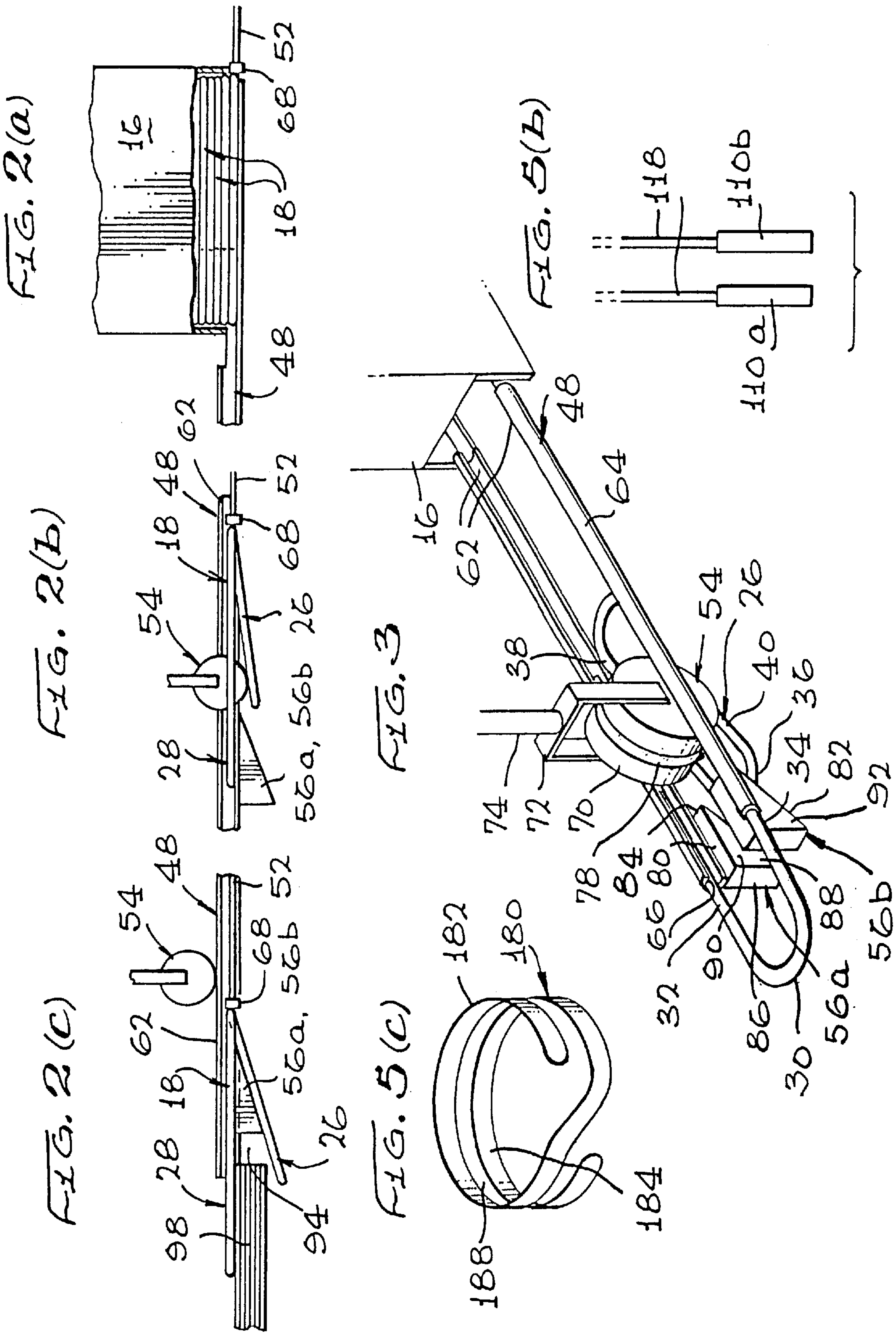
FIG. 3 is an enlarged perspective view showing the clip at one stage during the procedure of applying the clip to a stack of papers.

With reference to the drawings, and particularly FIG. 1 thereof, there is shown a clip fastener 10 contained within a housing 12. The housing 12 is substantially rectangular in side section, and has an opening 14 in which is releasably located a magazine 16 containing a plurality of clips 18, all of which are arranged in formation one on top of the other. The magazine 16 is long and narrow, following more or less the shape of the clip 18, and includes a lid 20 at its upper end which has attached thereto a spring 22 for urging the clips 18 downwardly. At a lower end 24 of the magazine 16, there is an opening 26 whereby a clip 18 can exit the magazine. Upon exiting the magazine 16, the clip 18 is placed on guide rails 48 for further application by the clip fastener 10, described more fully below.

To facilitate discussion of the clip fastener, including its structure and operation, a brief explanation of the parts of the clip will be given. With particular reference to FIG. 2(*d*), the clip 18 comprises a length of spring steel wire having an outer loop 28 and an inner loop 26. The outer loop 28 has a front bend 30 and side pieces 32 and 34. The inner loop 26 has a front bend 36 and a pair of side pieces 38 and 40. The clip also has a rear bend 42. Side piece 32 has end 44, while side piece 40 has end 46, the ends 44 and 46 being approximately in the same transverse plane of the clip.

Referring back to FIG. 1, the clip fastener 10 comprises a clip track 48 having on one end thereof a ram rod holder 50 connected to a ram rod 52. On the other end of the clip track 48, there is located a spring tension roller assembly 54 and a pair of wedged shaped spreaders 56*a* and 56*b*. The clip fastener 10 further comprises a recess 58 in which a stack of papers or other materials to be clipped together can be located. In short, a clip 18 is forced out of the magazine 16 onto the clip track 48, and the ram rod 52 moved to the left in FIG. 1, causing the ram rod 52 to engage the clip 18, and move it along the track 48 until it reaches the spreaders 56*a* and 56*b*. At this point, the roller assembly 54 pushes the inner loop 26 slightly downwardly, so that the spreaders 56*a* and 56*b* cause the inner loop 26 to move downwardly as the clip 18 progresses along its path. The inner and outer loops 26 and 28 are spread, and the ram rod 52 pushes it forward over a stack of papers or other materials which are located in the recess 58. At its furthest point, the ram rod 52 pushes the clip off the spreaders, and off the track 48, whereupon the clip is completely separated from the fastener, and is free to remain on the stack of papers or other materials. Ram rod 52 then retracts and is ready to push the next clip.

With reference to FIG. 1, an actuator 60 may be provided. The actuator 60 is located in the recess, and when moved by a stack of papers or other materials in the recess, causes the ram 52 to commence its cycle.

Reference is now made to FIG. 3 of the drawings which shows a detail of the track 48, roller 54, and spreaders 56*a* and 56*b*, and the effects of these structures on the clip 18. As will be noted, the track 48 lies immediately beneath the magazine 16. The downward pressure of spring 22 causes a clip 18 to exit the opening 26 of the magazine 16. The track 48 comprises a pair of rails 62. Forwardly or downstream of the magazine 16, the rails 62 are covered by a flange 64 which, together with the rail 62, defines a groove 66. When the clip is dispensed from the magazine 16, it is located on the pair of rails 62 such that side pieces 32 and 34 are at rest on the rails 62, but the side pieces 38 and 40 of the inner loop are not. As the ram rod, which has a flattened head 68 (see FIG. 1) pushes the clip 18 along the rails, the side pieces 32 and 34 are moved into the groove 66. With the side walls 32 and 34 in the grooves 66, the clip is well stabilized, and is essentially incapable of upward and downward movement. At this point, the clip may only move forwardly along the rails 62 within the grooves 66.

Upon further forward movement, the front bend 36 of the inner loop 26 reaches the location of the roller assembly 54. The roller assembly 54 comprises a wheel 70 held within a U-shaped fork 72, the fork 72 being connected to a portion of the housing by a stem 74. The stem 74 is capable of axial movement relative to the housing, which permits the roller assembly 54 to move up and down within small tolerances. This up and down movement is, to a significant extent, controlled by spring 76 which tends to urge the stem 74 downward. The spring 76 has sufficient tension so that the engagement of the wheel 70 with the front bend 36 of the inner loop 26 (to be discussed in more detail below) will result in downward movement of the inner loop 26, rather than upward movement of the wheel 70. The wheel 70 preferably includes a circular projection 78 around its diameter, the circular projection 78 being comprised of a material designed to engage more positively with the front end 36 of the inner loop 26.

The width of the wheel 70 is less than the space between the side pieces 32 and 34 of the outer loop 28. Therefore, neither the front bend 30 nor the outer loop 28 will be affected by the downward action of the wheel 70. However, the wheel 70 is of sufficient width so as to engage the side pieces 38 and 40 of the inner loop 26, as can be clearly seen in FIG. 3 of the drawings.

When the front bend 30 of the outer loop 28 passes under the wheel, the rigidity of the outer loop, by virtue of its containment within the grooves 66, ensures that the front bend 30 and outer loop 28 generally is not moved upwardly or downwardly by the roller assembly 54. At this point, the spring 76 will be compressed, allowing the roller assembly 54 to move slightly upward so that the front bend 30 of the clip can pass beneath it. The clip 18 continues to move forwardly until the front bend 36 of the inner loop 26 reaches the wheel 70. Since there is no restraint placed on the side pieces 38 and 40 of the inner loop 26, the downward force of the spring 76 will be sufficient to ensure that the wheel 70, and the circular projection 78 thereon, moves the front bend 36 slightly downwardly. This arrangement can best be seen in FIG. 2(*b*) which shows the wheel 70 just engaging the front bend 36 of the clip. As can also best be seen in FIG. 2(*b*), the roller assembly 54 is arranged such that it extends slightly below the level of the rail 62, and into the space defined between the end pieces 32 and 34 of the outer loop 28. The net effect of this arrangement is that the roller assembly 54 will slightly depress the front bend 36, and thereafter the side pieces 38 and 40, of the inner loop 26. The front bend 36 and side pieces 38 and 40 will be depressed just enough to enable the front bend 36, and subsequently side pieces 38 and 40, to pass below the spreaders 56*a* and 56*b*. FIG. 3 of the drawings clearly shows the situation, with the clip at the stage of the operation wherein the font bend 36 has just passed below the spreaders 56*a* and 56*b*, while the side pieces 32 and 34 of the outer loop 28, still on the rail 62 and captured within the groove 66, pass over the spreaders.

The spreaders 56*a* and 56*b* are essentially wedge-shaped structures spaced apart from each other, and each having an upper surface 80 which is horizontal, and a lower surface 82 inclined relative to the horizontal. The wedge-shaped spreaders 56*a* and 56*b* have a sharpened leading edge 84, and the spreaders widen into the vertical end 86. It is essential that there be a space 88 between the spreaders 56*a* and 56*b* to ensure that the clip 18 can pass completely over and off the spreaders 56*a* and 56*b*, as will be discussed below.

Each of the spreaders 56*a* and 56*b* may be independently connected to the housing 12 or other portion of the fastener 10 in a suitable manner, with the only requirement being that a space 88 between the spreaders 56*a* and 56*b* remain open so that the clip 18 can pass over and through the spreaders 56*a* and 56*b*. In one embodiment, the spreaders 56*a* and 56*b* may be attached by welding or other suitable means to the forward end of the rail 62, or they may be mounted on brackets or the like so as to be firmly held in position.

Each of the spreaders 56*a* and 56*b* has an inner wall 90 and an outer wall 92. The distance between the respective outer walls 92 of the spreaders is preferably just slightly less than the distance between the side pieces 32 and 34 of the outer loop 28. The width, or thickness, of the spreaders, represented by the distance across upper surface 80, may be variable, but should be sufficient to engage the side pieces 38 and 40 of the inner loop 26 as the path of the clip 18 moves over the wedges.

As the clip moves along its path, in the rails 62, the front bend 36 is engaged by the projection 78 of the wheel 70 of the roller assembly 54, and slightly depressed in such a way so as to ensure that the front bend 36, and the side pieces 38 and 40 which follow, pass below the leading edge 84 of the spreaders 56*a* and 56*b*. The side pieces 38 and 40 of the inner loop 26 move down the inclined plane represented by the lower surface 82 of the spreaders 56*a* and 56*b*. On the other hand, the side pieces 32 and 34 of the outer loop 28 remain stable within the groove 66 and do not flex. Therefore, the effect of the spreaders 56*a* and 56*b* is to create a space, which increases in size as the clip progresses along its path over the spreaders 56*a* and 56*b*, between the outer loop 28 and the inner loop 26. With reference to FIG. 2(*c*), this space 94 can be clearly seen. Even in FIG. 2(*b*), the small space formed merely by the action of the wheel 70 on the roller assembly 54 has already been created, and increases in size as the clip 18 moves forward along the rail 62.

Referring back to FIG. 1 of the drawings, it will be seen that the recess 58 has an abutment surface 96 at the forward end thereof. When a stack of papers or other materials is inserted in the recess, it is able to move forward therein until reaching the abutment surface 96, at which point further movement is prevented. The abutment surface 96 is immediately adjacent the front vertical end 86 of the spreaders 56*a* and 56*b*. The papers 98 are shown in position in FIG. 2(*c*) of the drawings.

At the point where the clip eventually reaches the papers 98, the outer loop 28 and inner loop 26 have been separated so that the maximum space 94 has been created. This space is more than sufficient to accommodate the pile of papers 98, and to ensure that the outer loop 28 goes on the top side of the papers 98 (as seen in FIG. 2(*c*)), while the inner loop 26 passes below the stack of papers 98. As the clip continues to move forward, the outer loop 28 and inner loop 26 straddle the papers 98.

The final stage in the process of placing a clip over the papers or other materials is for the ram rod 52 to continue to push the rear bend 42 of the clip, until the clip passes completely over the spreaders 56*a* and 56*b*, and out of the groove 66 defined by the rail 62 and flange 64. As the clip continues to move over the spreaders 56*a* and 56*b*, the end 44 passes over the upper surface 80 of the spreader 56*a*, while the end 46 passes under the spreader 56*b*, along the lower surface. The rear bend 42 passes through the space 88 between the spreaders 56*a* and 56*b* and off the track mechanism. At this point, the clip straddles the papers 98, and the outer loop 28 and inner loop 26 are no longer being forced apart, so that the tensile strength of the clip wire is allowed to hold the papers 98 securely together in a stack. The ram rod 52 is withdrawn to its retracted position, ready for the application of the next clip which is forced from the opening 26 of the magazine 16, and onto the rail 62.

With reference to FIGS. 2(*a*), 2(*b*) and 2(*c*) of the drawings, there is shown sequentially the various stages of the clip as it moves along its pathway from the magazine exit to the papers. These figures have already been referred to above, and consist of the start position represented by FIG. 2 (*a*), the action of the roller assembly 54 in FIG. 2 (*b*), and separation by the spreaders 56*a* and 56*b* in FIG. 2(*c*).

Figure 4:
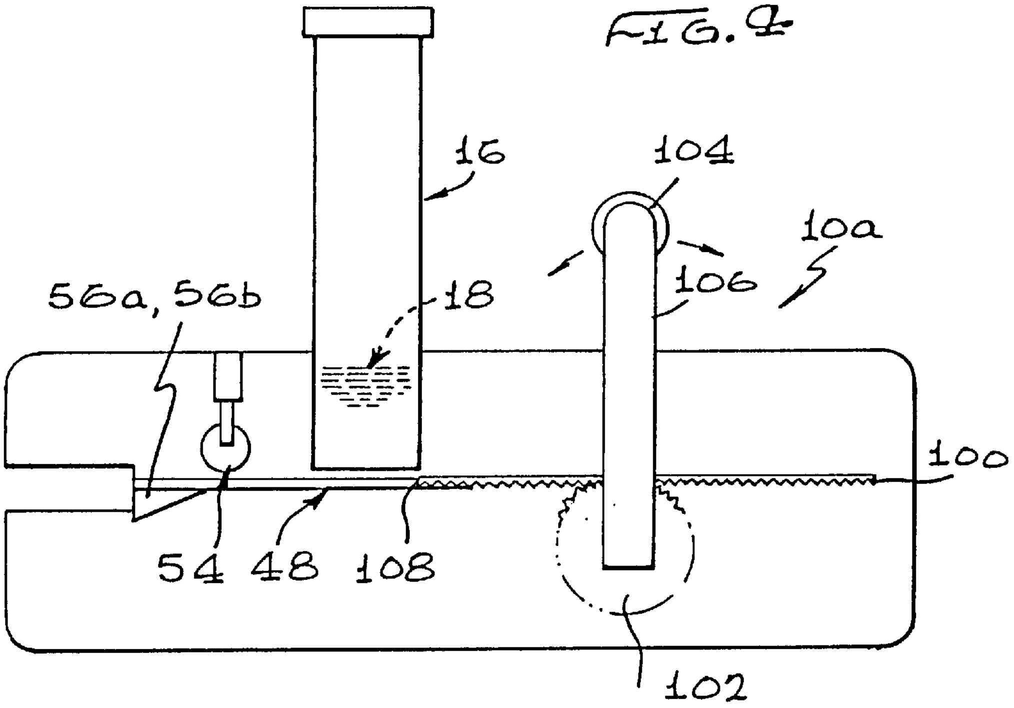
FIG. 4 is a diagrammatic side view showing a second embodiment of the clip fastener of the invention.

With reference to FIG. 4 of the drawings, there is shown a clip fastener 10*a* in another embodiment. In this particular fastener, the ram rod and ram are replaced by a cog ram rod 100 arranged in horizontal fashion within the fastener 10*a*. The cog ram rod 100 is capable of linear horizontal movement, and is actuated by rotation of a cog wheel drive 102 which is rotated by a handle 104 mounted on a shaft 106. The teeth on the cog wheel drive 102 engage the teeth on the cog ram rod 100 urging the cog ram rod 100 forward toward the clip track 48. The cog ram rod 100 has a head 108 which engages the rear bend 42 of a clip.. The effect of the cog ram rod 100 is essentially identical to that of the ram rod 52, and moves the clip along the track toward the roller assembly 54, over the spreaders 56*a* and 56*b*, and toward the recess 58 where papers 98 arranged in a pile are present for securing.

Other than the mechanism for moving the clip, namely, the cog ram rod 100, cog drive wheel 102 and associated structures, the clip fastener 10*a* is essentially the same as that shown in the embodiment shown in FIG. 1.

Figure 5A:
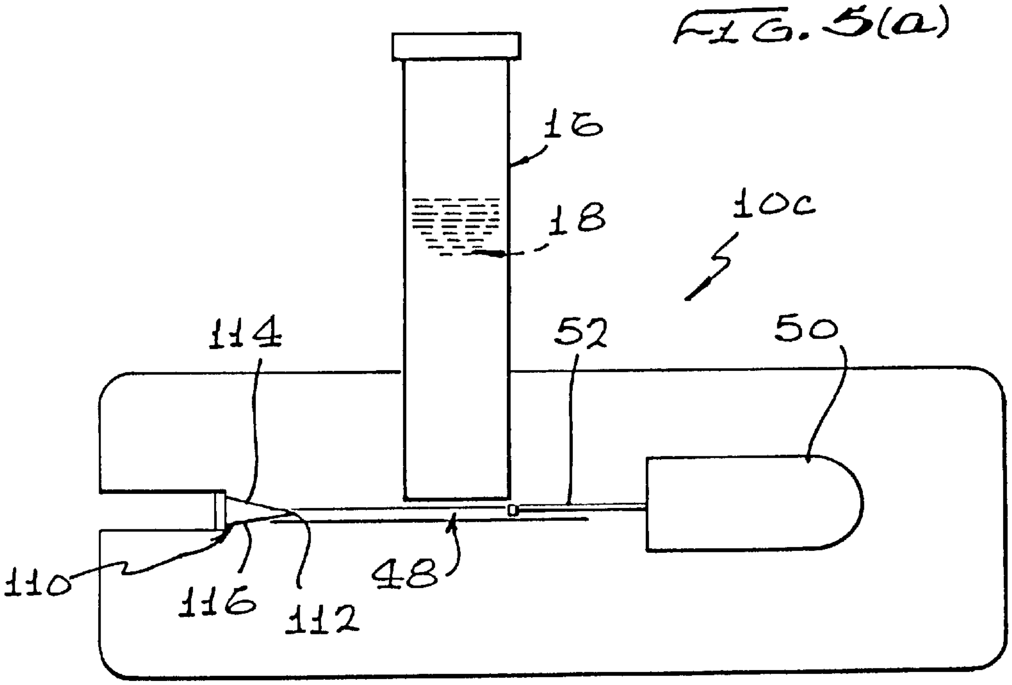
FIG. 5(*a*) is a schematic side view showing a third embodiment of a clip fastener of the invention.

Reference is now made to FIGS. 5(*a*) and 5(*b*) of the drawings, which show a clip fastener 10*c* which may be used on a ring clip of the type schematically shown in FIG. 5(*c*) of the drawings, in a spread apart manner for clarity. The ring clip 180 has an upper ring 182 and a lower ring 184 joined at a crossover portion 186. The upper and lower rings 182 and 184 can be forced part to create a space 188, but the natural resilience of the clip 180 will urge the upper and lower rings 182 and 184 into a closed position. In this embodiment, the clip fastener 10*c* is similar to the one shown in FIG. 1, but the spreader 110 is differently located and structured in the embodiment shown in FIGS. 5 (*a*) and (*b*). Each spreader 110*a* and 110*b* has a sharpened leading edge 112 with an inclined upper surface 114 and an inclined lower surface 116. The forward movement of a ring clip 180 (shown in FIG. 5(*c*)) is such that the leading edge of the spreader 110*a* engages the clip 180, as it moves forwardly along the rails 118 shown in FIG. 5(*b*). The leading edge 112 engages, opens and separates the upper and lower rings 180 and 182, thereby creating, temporarily, the space 188 between the upper and lower rings respectively in much the same way as was illustrated in FIG. 3.

With reference to FIG. 6 of the drawings, an embodiment having the wedge-shaped spreader 110 shown in FIG. 5(*a*) is included in the clip fastener 10*a*, and differs from the embodiment shown in FIG. 5(*a*) in that a cog ram rod 100 and cog drive wheel 102 of the type described with respect to FIG. 4 are used to drive the clip forward along the track, as opposed to the ram rod 52 and ram 50 shown in FIG. 5(*a*).

In FIG. 7(*a*) of the drawings, a variation of the roller assembly 54 is provided. A shaped steel spring 117 is appropriately attached by tacks 121 or other structure to the front wall of the housing 12. The spring 117 extends toward to the spreaders 56*a* and 56*b*. The spring 117 has a somewhat rounded extension portion 123 and a shallow U-shaped operational portion 120, the operational portion 120 having its nadir or lowermost point 122 at the point immediately preceding the leading edge 84 of the spreaders 56*a* and 56*b*. The width of the entire spring 117 is less than the distance between the side pieces 32 and 34 of the outer loop 28, and therefore could move up and down freely past these side pieces 32 and 34. However, the width of the spring 117, at least at the operational portion 120, has a width which is approximately equal to the distance between the side pieces 38 and 40 of the inner loop 26.

The spring 117 is constructed so as to apply a downward force to the inner loop 26, thus moving it below the level of the rails 62 and groove 66 at the point immediately before the leading edge 84 of the spreaders 56*a* and 56*b*. The operational portion 120 forces down the inner portion to initially form the space 90 (FIG. 7(*b*)), and make it just sufficiently large so that the inner loop will pass below the leading edge 84 of the spreaders 56*a* and 56*b* and slide along the inclined lower surface 82 of the spreaders. The effect is the increasing of the size of the space as the clip moves forward over the spreaders. The side pieces 32 and 34 of the outer loop 28 continue to slide forward in the groove, as was the case with respect to the embodiment shown in FIG. 3 of the drawings. The space 90 created by the action of the operational portion 120 of the spring 117 can best be seen in the side view of the embodiment shown in FIG. 7(*b*) of the drawings.

FIG. 7(*a*) includes an actuator switch assembly 126, also shown in greater detail in FIG. 7(*c*) . The switch assembly 126 comprises a striker member 128 which can be moved slightly backward and forward. When papers or other materials are brought to bear against the striker member 128, this causes the striker member 128 to contact and close the switch circuit 130. Switch leads 132 activate an electrically or pneumatically driven ram which then drives ram rod forward to engage the clip and move it along the track 48 in the manner described above. In this embodiment, the clip fastener can be operated by an electric motor or solenoid, as opposed to manually, and, upon activation of the switch by inserted papers or other materials in the recess, causes the clip to advance and clasp the papers or other materials.

In a variation, it is not necessary that the electric motor be activated by the striker member 128, as shown in FIG. 7(*c*). It is quite conceivable and within the scope of the invention that a separate switch elsewhere on the clip fastener 10 be provided so that it can be activated by the user when paper or other material has been inserted into the recess.

In the embodiment of FIG. 8, the housing includes, adjacent the recess 58, a base member 134 and a corresponding cover 136 extending from the housing. The base 134 and cover 136 define between them a slot 138 in which a stack of papers or other materials can be inserted. The cover 136 has a shallow groove 140 of slightly wider dimension so that the outer loop of the clip, as it emerges from over the spreaders, is received therein. The base 134 has a shallow groove 142, this time of slightly narrower dimension, so that it can receive therein the inner loop of the clip. The shallow grooves 140 and 142 provide a guide or space for the outer loop and inner loop of the clip as they emerge from the track, and after they have been dispensed therefrom. This helps to ensure that the clip's pathway continues along the same axis as the track, and that it is not misdirected or crookedly located over the papers or other materials.

Different size clips are manufactured, particularly a standard smaller size and a jumbo size clip. FIGS. 9, 10, 11 and 12 show embodiments which are appropriately adjustable so that different size clips can be accommodated.

Figure 9:
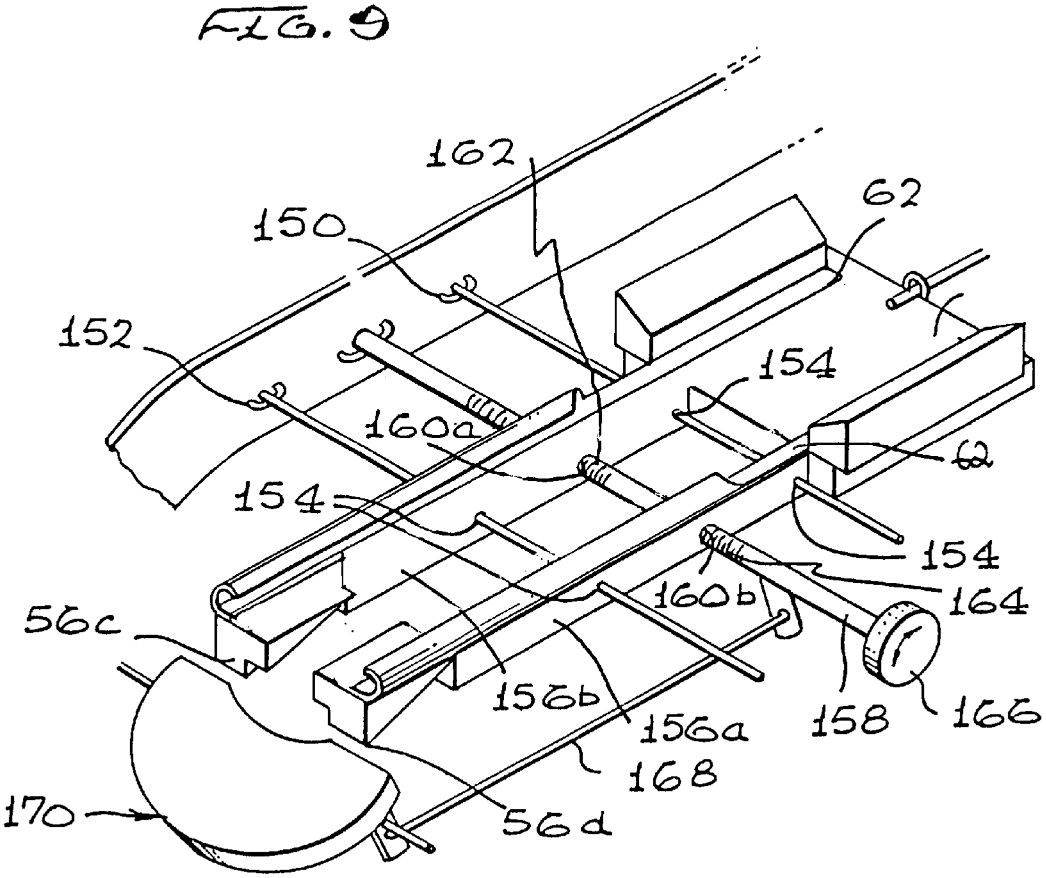
FIG. 9 is a perspective view of an adjustable clip fastener which can be adjusted to receive and affix clips of different sizes.

The essential components shown in the dual-loading clip fastener in FIG. 9, which illustrates a perspective view of this embodiment, are much the same as those shown with respect to the earlier embodiments. It is, however, to be noted that the rails 62 are not fixedly mounted, but are capable of moving toward and away from each other. Each rail 62 is mounted and aligned by a pair of supports 150 and 152 which extend through small apertures 154 in the rail tracks 156*a* and 156*b*. The supports 150 and 152 are mounted in the holes 154 so that the rail tracks 156 can slide therealong, and are not fixed with respect to the supports 150 and 152. Between the supports 150 and 152 is a selector rod 158 which extends through holes 160*a* and 160*b* in the rail tracks 156*a* and 156*b*. The mounting selector rod 158 has screw threads. Screw threads 162 having a first direction pass through one hole 160*a*, while screw threads 164 having a reverse direction to that of screw threads 162 pass through the hole 160*b*. The selector rod 158 has at one end thereof a selector knob 166, the rotation of which causes the rails to move toward, or away from, each other by virtue of the action of the oppositely directed screw threads 162 and 164. Thus, the distance between the rails 62 will be varied depending upon the position of the selector knob 166 and the selector rod 158. In a first position, the tracks 156*a* and 156*b* may define a smaller space between them, sufficient to receive a standard clip, while upon rotation of the selector knob 166, the tracks 156*a* and 156*b* move away from each other to create a larger space therebetween sufficient to receive and accommodate a jumbo or larger size clip. The selector knob 166 can be turned so that any distance between the tracks 156*a* and 156*b* from the small extreme to the large extreme can be achieved, permitting a large number of different sizes of clips to be processed by the clip fastener 10.

Figure 10:
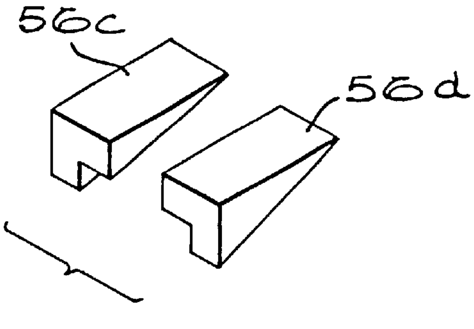
FIG. 10 is a detailed perspective view of the pair of wedges shown in FIG. 9.
Figure 11:
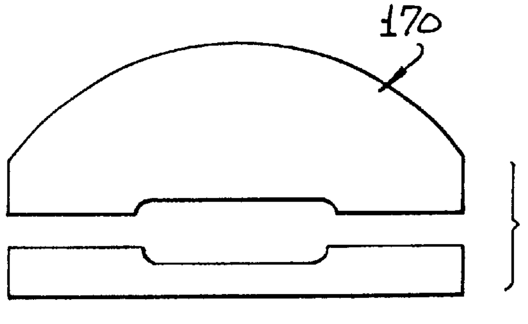
FIG. 11 is a front view of the clip fastener as shown in FIG. 9.

Spreaders 56*c* and 56*d* are structured so as to have two different gradients. In FIGS. 9 and 10, it will seen that the spreader 56*b* defines on the outside a larger gradient wedge, while on the inside a wedge of a smaller gradient is provided. The space that needs to be created between the outer loop and the inner loop may be different for smaller and larger clips respectively. A larger clip would pass over that portion having an increased gradient, while, when the rails are brought closer together, the smaller gradient portion of the wedge 56 would create a smaller space which would be more appropriate for a clip of that size. FIG. 10 shows the spreaders in slightly more detail which highlights the different gradients of the two portions of each spreader.

Operation of the selector knob 166, and hence the selector rod 158, also moves, through a linkage 168 to the paper support 170, elevating it so that it is higher when a smaller clip is being used, and lowering it when a larger clip is being used. The ability to raise and lower the paper support 170 makes it possible to process both large and small stacks of paper depending upon the size of the clip used. Selecting a small clip by rotating the selector knob 166 will raise the paper support 170 to prevent too many papers from entering the slot 138.

Referring to FIG. 12 of the drawings, there is a shown a variation of a roller which may be used with an adjustable or dual loading clip fastener shown in FIG. 9. The roller 190 includes a wheel 192 mounted on a fork 194, attached to a stem 196 and spring mechanism 198, as previously described. In the roller 190, the outer surface 200 of the wheel 192 has a sleeve 202 thereabout extending partially across the wheel 192. The wheel 192 at its outer edges 204 has the appropriate diameter so as to depress jumbo or larger size clips, while sleeve 202 has a diameter of a size suitable to depress the smaller or standard size clips.

FIGS. 13 and 14 of the drawings shows an alternative embodiment to the magazine. In place of the magazine shown in some of the previous embodiments, there is provided a cartridge 250 having parallel planar side walls 252 and 254 and rounded end walls 256 and 258. The walls 252, 254, 256 and 258 define a space or chamber 260 shaped approximately like a paper clip and designed to receive a plurality of stacked clips (not shown) . The cartridge 250 has a lid 262 including an interior spring 264. When the lid is placed on the cartridge 250, the spring 264 pushes down on clips in the chamber 260, urging them towards bottom wall 266.

Each end wall 256 and 258 has a locking indent 268 and 270 respectively which facilitates releasable locking engagement with the remainder of the clip fastener to which it attaches. Each indent 268 and 270 will slidably receive a ball or other shaped projection from the adjacent portion of the clip fastener housing 12 which will hold it firmly in position.

A front opening 272 and a rear opening 274 are positioned near the bottom wall 266 of the cartridge 250. The openings 272 and 274 are aligned and allow a ram or other element of the clip fastener to pass therethrough and eject the lowermost clip in the cartridge chamber 260.

The cartridge 250 may be loaded with individual clips or a glued array of clips. Preferably, the cartridge will have two sizes, namely, for small and large clips respectively. The exterior dimensions of the cartridge 250 will be substantially the same, except for the lower portion. This lower portion will be smaller or larger according to the size of the clip contained in the chamber 260. Since the exterior dimensions are for the most part the same, both cartridges (for small and large clips) will fit on the housing of the clip fastener without modification of the clip fastener. However, the interior chamber 260 of each cartridge 250 will be suitably configured to accommodate either small or large clips, as the case may be. A particular cartridge may in fact be convertible from one to the other. FIGS. 15(*a*) and 15(*b*) show a small lower end and a large lower end respectively which will be inserted in the clip fastener of the invention, and through which the ram or other component will eject the lowermost clip.

Figure 16:
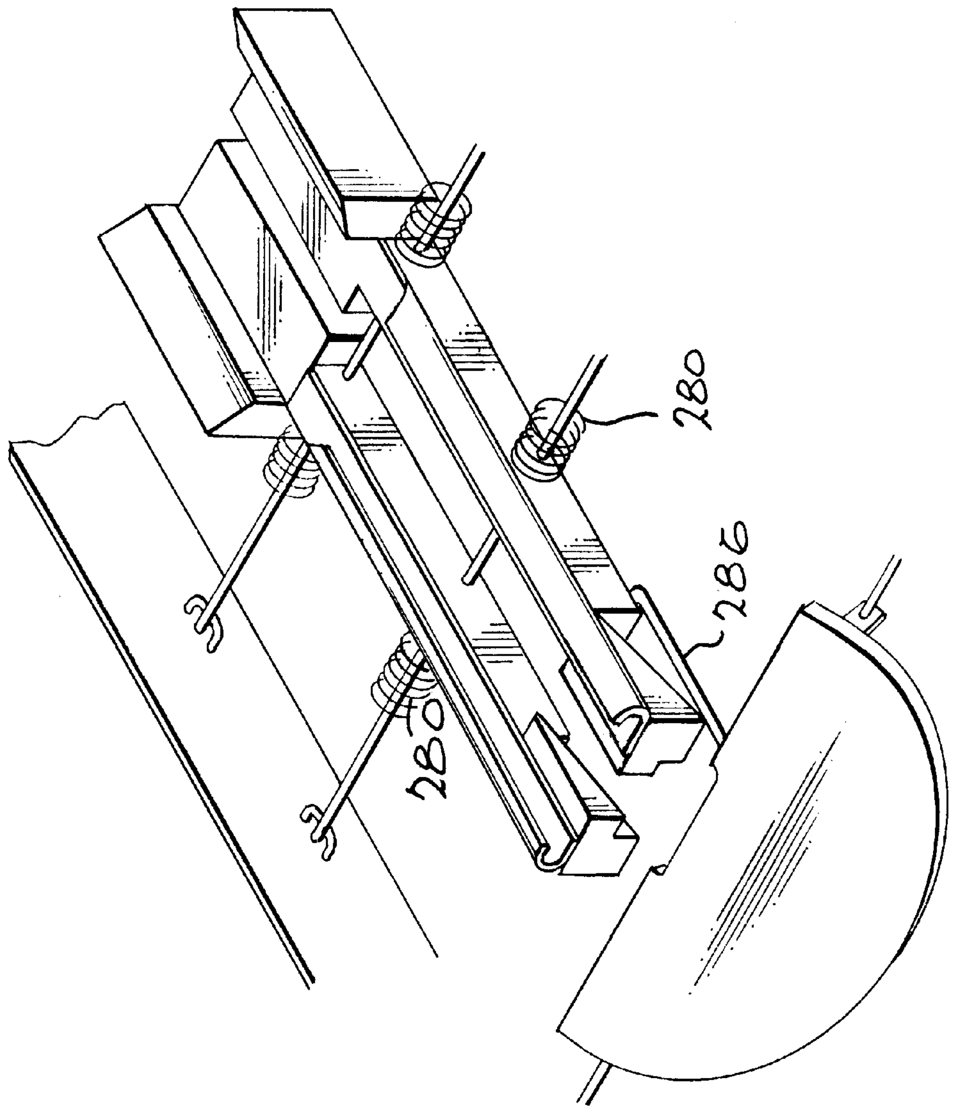
FIG. 16 is a perspective view of another embodiment of the invention using springs to move the guide and tracks.

When the cartridge 250 is inserted into the opening of the clip fastener, the guides will be moved apart if the cartridge lower end is large (as in FIG. 15(*b*)), but unaffected if the cartridge accommodates small clips and has a narrowed lower end (as in FIG. 15 (*a*)). In other words, the default position to which the guides are urged is the one for accommodating the smaller clips. Where large, the tracks will be moved apart by the lower end of the large clip cartridge, the tracks being attached to the guides which have been shifted. The slightly parted tracks will therefore be automatically adjusted so they are correctly separated by an amount suitable for the clip which is being used. Springs pressing against the sides of the guides will push them as well as the track towards each other when a small clip cartridge is inserted. FIG. 16 shows the arrangement where springs 280 on the sides have this effect and facilitate the correct positioning of the guides and tracks according to the size of the lower of the cartridge 250.

FIG. 17 shows a front view where the lower jaw has a spring underneath it so that the space or size of the opening can be adjusted depending upon the number of pages which are inserted. This opening or gap may be linked with the track mechanism so that the opening is smaller when small clips are being used, while it is expanded when larger clips are being used. This can be achieved by conventional means wherein the movement of the tracks toward or away from each other correspondingly adjusts the size of the opening defined by the jaws. A cam or gear mechanism can be used to achieve this automatic adjustment. With reference to FIGS. 16 and 17, one such arrangment is shown.

FIG. 16 illustrates the presence of an adjustment rod 286 which moves inwards or outwards with the corresponding movement of the track 156*a*. The adjustment rod 286 fits into a hollow wedge 288, shown in FIG. 17, and moves back and forth in the directions indicated by the arrow 290. When the rod 286 is moved to the left, the spring 292 will push the lower jaw up. When the adjustment rod 286 is moved to the right, it will ride along the diagonal of the wedge 288, acting against the spring to push the lower jaw down. This will increase the size of the opening.

The invention is not limited to the precise details described herein. Many variations are possible within the scope of the invention.

What is claimed is:

1. A clip fastener comprising:

a housing;

a releasable cartridge located in or on the housing for holding a plurality of clips;

a track defining a pathway and comprising a pair of substantially parallel surfaces for receiving and holding a clip from the cartridge and a space between the pair of surfaces;

adjusters for moving the pair of surfaces between a first position wherein the space is dimensioned so that a first sized clip can move along the track and a second position wherein the space is increased so that a larger second sized clip can move along the track;

means for moving the clip along the pathway defined by the track; and spreader means in the pathway for separating an inner loop of the clip from an outer loop thereof.

2. A clip fastener as claimed in claim 1 wherein the releasable cartridge comprises a magazine having rectangular or oval body for receiving a plurality of stacked clips, the body having a lid and a spring for urging the plurality of clips in a direction away from the lid, the body further having a dispensing aperture at an end opposite that of the lid, wherein a clip within the reservoir is dispensed through the dispensing aperture.

3. A clip fastener as claimed in claim 1 wherein the track comprises a pair of substantially parallel guide rails, each guide rail for receiving a side piece of an outer loop of the clip, the distance between the rails slightly exceeding the width defined by side pieces of an inner loop of the clip.

4. A clip fastener as claimed in claim 3 wherein a section of the rails further comprises an overlapping flange, the flange and the rails defining a groove within which the side pieces of the outer loop of the clip can be received.

5. A clip fastener as claimed in claim 4 wherein the rail without flange is located adjacent to a dispenser aperture of the magazine, and the rail with flange overlap defining a groove located along the pathway downstream of the magazine.

6. A clip fastener as claimed in claim 1 wherein the means for moving the clip along the pathway defined by the track comprises a ram and ram rod, the ram rod having a head portion for engaging the clip and pushing it along the pathway.

7. A clip fastener as claimed in claim 6 wherein the ram rod is mechanically activated.

8. A clip fastener as claimed in claim 6 wherein the ram rod is electrically operated.

9. A clip fastener as claimed in claim 8 further comprising a motor for driving the ram rod.

10. A clip fastener as claimed in claim 1 further comprising an actuation member, the actuation member being triggered by paper or other materials inserted into the clip fastener and activating the motor to move the ram rod with respect to the track.

11. A clip fastener as claimed in claim 7 wherein the mechanically activated means for moving comprises a lever arm connected to the ram, whereby movement of the lever arm advances and retracts the ram rod.

12. A clip fastener as claimed in claim 7 further comprising a cog wheel rotated by a manually operated lever arm, the ram rod being engaged by the cog wheel, whereby movement of the lever arm rotates the cog wheel to linearly advance or retract the ram rod.

13. A clip fastener as claimed in claim 1 wherein the spreader means comprises a pair of wedge-shaped spreaders having a sharpened leading edge, an upper surface substantially parallel and coplanar with the track, and a lower inclined surface, each wedge for engaging a clip as it moves along the pathway for separating the inner loop of the clip from the outer loop thereof.

14. A clip fastener as claimed in claim 1 further comprising a depressing member immediately upstream of the spreader means, the depressing member for pushing down slightly a leading part of the inner loop of the clip to facilitate engagement of the spreader between the inner loop and the outer loop.

15. A clip fastener as claimed in claim 14 wherein the depressing means engage and push down the inner loop of the paper clip, but not the outer loop thereof.

16. A clip fastener as claimed in claim 15 wherein the depressing means comprises a wheel mounted on a shaft, the shaft including a spring urging the wheel in a direction for engaging the inner loop and separating it from the outer loop to form a space therebetween, the tension in the spring being sufficient to urge the inner loop away from the outer loop so as to create the space, the tension in the spring being such that the wheel can be raised to permit the outer loop to pass thereunder.

17. A clip fastener as claimed in claim 14 wherein the depressing means comprises a length of shaped spring steel adapted to engage the inner loop of the clip and to separate it so as to create a space between the inner loop and the outer loop.

18. A clip fastener as claimed in claim 1 wherein the track for receiving clips is adjustable so as to be capable of accommodating clips of different sizes.

19. A clip fastener as claimed in claim 18 wherein the adjustable track comprises a pair of substantially parallel rails mounted on support members, the support members including actuation means for moving the pair of rails toward or away from each other.

20. A clip fastener as claimed in claim 18 wherein the spreader means comprises a pair of wedge-shaped members, each of which is associated with a rail, each wedge-shaped member having an upper surface substantially coplanar and parallel with its associated rail, each wedge-shaped member further comprising a larger flat end tapering toward a leading edge adapted to face a clip and separate the inner loop thereof from the outer loop, each wedge-shaped member having a steeper tapering portion and a gentler tapering portion, the steeper tapering portion being operative when the rails are further apart and adapted to receive a larger clip, and the gentler tapering portion operative when the rails are moved toward each other and adapted to receive a smaller clip.

21. A clip fastener as claimed in claim 1 further comprising a base member and cover defining therebetween a slot, the base member and cover being attached to the housing downstream of the spreader means, the slot for receiving a stack of papers or other materials for insertion therein and for proper positioning to receive a clip.

22. A clip fastener as claimed in claim 21 wherein the cover and the base member each have shallow grooves therein, the grooves being coaxial with the track member so as to guide a clip after the clip has passed over the spreader means.

23. A clip fastener as claimed in claim 1 wherein the releasable cartridge comprises a body defining a chamber for receiving a plurality of clips, means for urging the clips toward a base of the body, and a lower end dimensioned according to the size of the clip received within the chamber.

24. A clip fastener as claimed in claim 23 wherein the lower end of the releasable cartridge, upon insertion of the releasable cartridge into the housing of the clip fastener, automatically adjusts the distance between the tracks so that the tracks are able to accommodate a large or small clip respectively.

25. A clip fastener as claimed in claim 23 wherein the releasable cartridge comprises locking indents for receiving projections on the housing of the clip fastener, the locking indents and projections together effecting a releasable connection between the releasable cartridge and the housing of the clip fastener.

26. A clip fastener as claimed in claim 23 wherein the body of the releasable cartridge comprises substantially opposing openings therein near the lower end to define the pathway through the releasable cartridge for the means for moving the clip along the pathway.

27. A clip fastener as claimed in claim 23 further comprising springs for urging the tracks toward each other, the lower end of the releasable cartridge, upon insertion into the housing of the clip fastener, forcing the tracks apart against the action of the springs to increase the distance between the tracks.

28. A clip fastener as claimed in claim 1 further comprising a base member and cover defining therebetween a slot, the base member and cover being attached to the housing downstream of the spreader means, the slot for receiving a stack of papers or other materials for insertion therein and for proper positioning to receive a clip, the clip fastener further comprising adjustment means for varying the size of the slot according to the size of a lower end of the releasable cartridge.

* * * * *